United States Patent
Cheng et al.

(10) Patent No.: US 12,006,265 B2
(45) Date of Patent: Jun. 11, 2024

(54) PROCESS FOR THE PREPARATION OF A CERAMIC NANOWIRE PREFORM

(71) Applicant: NORTHWESTERN POLYTECHNICAL UNIVERSITY, Xi'an Shaanxi (CN)

(72) Inventors: Laifei Cheng, Xi'an Shaanxi (CN); Fang Ye, Xi'an Shaanxi (CN); Chuchu Guo, Xi'an Shaanxi (CN); Litong Zhang, Xi'an Shaanxi (CN)

(73) Assignee: NORTHWESTERN POLYTECHNICAL UNIVERSITY, Xi'an Shaanxi (CN)

( * ) Notice: Subject to any disclaimer, the term of this patent is extended or adjusted under 35 U.S.C. 154(b) by 722 days.

(21) Appl. No.: 17/072,100

(22) Filed: Oct. 16, 2020

(65) Prior Publication Data
US 2021/0114940 A1 Apr. 22, 2021

(30) Foreign Application Priority Data
Oct. 16, 2019 (CN) .......................... 201910980538.6

(51) Int. Cl.
*C04B 35/80* (2006.01)
*C04B 35/622* (2006.01)

(52) U.S. Cl.
CPC ........ *C04B 35/62281* (2013.01); *C04B 35/80* (2013.01); *C04B 2235/483* (2013.01); *C04B 2235/5244* (2013.01); *C04B 2235/5252* (2013.01); *C04B 2235/5264* (2013.01); *C04B 2235/6562* (2013.01); *C04B 2235/6567* (2013.01); *C04B 2235/6583* (2013.01); *C04B 2235/77* (2013.01)

(58) Field of Classification Search
CPC .............. C04B 35/62281; C04B 35/80; C04B 2235/483; C04B 2235/5244; C04B 2235/5252; C04B 2235/5264; C04B 2235/6562; C04B 2235/6567; C04B 2235/6583; C04B 2235/77; C04B 35/62272; C04B 35/62277; C04B 35/6229; C04B 35/62295; C04B 35/6267; C04B 35/62675; C04B 2235/422; C04B 2235/48; C04B 35/565; C04B 2235/6581; C04B 2235/94; C04B 2235/95
See application file for complete search history.

(56) References Cited

U.S. PATENT DOCUMENTS

2015/0344310 A1   12/2015   Awadallah-F

FOREIGN PATENT DOCUMENTS

| CN | 101607743 A |   | 12/2009 |
|----|-------------|---|---------|
| CN | 102701207 A |   | 10/2012 |
| CN | 103553616 A | * | 2/2014  |
| CN | 105884356 A |   | 8/2016  |
| CN | 108101542 A | * | 6/2018  |
| CN | 108117403 A |   | 6/2018  |
| CN | 108329043 A |   | 7/2018  |
| CN | 108467253 A |   | 8/2018  |
| EP | 3326989 A   |   | 5/2018  |

OTHER PUBLICATIONS

Hu et al., "Crack Healing Behavior of SiC Whisker Reinforced Si3N4 Composite", Materials Science Forum, 2013, 750: 15-18.
Chen et al., "Microstructure and properties of SiCw/SiC composites prepared by gel-casting combined with precursor Infiltration and pyrolysis", Ceramics International, 2018, 44(1): 969-979.
Cheng et al., "Strong and thermostable SiC nanowires/graphene aerogel with enhanced hydrophobicity and electromagnetic wave absorption property", Applied Surface Science, 2018, 448: 138-144.
Su et al., "Ultralight, Recoverable, and High-Temperature-Resistant SiC Nanowire Aerogel", ACS Nano, 2018, 12(4): 138-144.
Kong et al., "Preparation research of silicon carbide nanowires synthesized by polymeric precursor pyrolysis", Chemical Research, 29:1, 73-78 (2018).
Bradbury et al., "Synthesis of Carbide Nanostructures on Monolithic Agricultural-Waste Biomass-Activated Carbon Templates", Int. J. Appl. Ceram. Technol., 8(4) 947-952 (2011).

* cited by examiner

Primary Examiner — Kumar R Bhushan
(74) Attorney, Agent, or Firm — Morgan, Lewis & Bockius LLP (57) ABSTRACT

Process for the preparation of a ceramic nanowire preform, in particular, a process for the preparation of a ceramic nanowire preform by combining a template technique and a preceramic polymer conversion technique. The process uses carbonaceous material as a template, and prepares an isotropic ceramic nanowire preform by controlling the ratio of a precursor to a solvent, the amount of a catalyst and the ratio of a prepared precursor solution to the carbonaceous template, wherein the preform is isotropic and has lower bulk density and higher volume fraction.

27 Claims, 5 Drawing Sheets

PROCESS FOR THE PREPARATION OF A CERAMIC NANOWIRE PREFORM

TECHNICAL FIELD

The present invention relates to a process for the preparation of a ceramic nanowire preform, and in particular a process for the preparation of a ceramic nanowire preform by combining a template technique and a preceramic polymer conversion technique.

BACKGROUND

The ceramic matrix composite (CMC), such as silicon-based composite-silicon carbide and silicon nitride ceramic matrix composite, and ultrahigh temperature-based composite-zirconium carbide and zirconium boride ceramic matrix composite, has excellent performances of high strength, high modulus, good toughness, low density, high temperature resistance (the silicon-based ceramic matrix composite can resist 1450° C. and the ultrahigh temperature ceramic matrix composite can resist 2000° C.), wear resistance, corrosion resistance and the like, and is widely applied to various industrial fields of aerospace, nuclear energy, braking systems and the like. The ceramic matrix composite mainly comprises a reinforcement and a matrix. The reinforcement has the characteristics of high strength and high modulus, and can play a role in reinforcing and toughening the ceramic matrix. The reinforcement can be shaped by different processes into a macroform with rigid structural features, which is called a preform. For the ceramic matrix composite, the preform is a key structural unit for obtaining excellent performance, which is not only a framework of the ceramic matrix composite but also determines the toughness, reliability and service life of the ceramic material.

The ceramic reinforcement developed at present mainly comprises continuous fibers, whiskers and nanowires, and the process difficulties for forming preforms from different reinforcements are different. The continuous fiber reinforced silicon carbide ceramic matrix composite is the ceramic matrix composite which is most researched, most successfully applied and most widely used at present, and is an indispensable material for development of the technical fields such as aerospace. Continuous fibers typically require to undergo a weaving process to form into a fiber preform having a two-dimensional (2D), two and a half-dimensional (2.5D) or three-dimensional (3D) structure. The continuous fiber preform has excellent reinforcing and toughening effects on the matrix and strong designability, and can meet the manufacturing requirements of large-size and thick-wall parts in the aerospace field. However, (1) fiber damage is easily caused in the weaving process of the continuous fiber preform, the formed pore structure has selectivity on the subsequent matrix process, and the weaving pores are likely to become structural defects to influence the performance of the composite; (2) due to the structural characteristics of the preform, the continuous fiber reinforced ceramic matrix composite shows anisotropy of different degrees, which is not beneficial to the service of the composite under complex stress; (3) the proportional limit stress of the material is low due to the nonlinear mechanical behavior generated by the weak interface of the fiber/matrix; (4) the service temperature of the continuous fiber reinforced ceramic matrix composite is determined by fibers to a great extent, and for the silicon carbide fiber reinforced ceramic matrix composite suitable for hot end parts of aircraft engines, the high-temperature mechanical property of the composite is poor and the application conditions are greatly limited because the resistance temperature of the silicon carbide fiber is generally lower than 1400° C.

In order to solve the problems of the continuous fiber reinforced ceramic matrix composite, researchers use whiskers, which are short fiber-shaped single crystal materials with few internal impurity defects and uniform phase components, and as a reinforcement, hopefully improve the existing problems of the continuous fiber reinforced ceramic matrix composite. The conventional method for forming whisker materials is hot-press sintering. Relevant studies include: Junfeng Hu et al. discloses a process comprising mixing silicon carbide whiskers with silicon nitride particles, then adding the sintering aids of aluminum oxide and yttrium oxide, performing ball-milling for 46 h, and performing sintering for 2-4 h at 1825° C. under 1 MPa of nitrogen atmosphere to obtain the silicon carbide whisker reinforced silicon nitride composite. (Materials Science Forum, 2013, 750:15-18). Although the composite prepared by the method has high strength, the toughness is poor, and the method is not beneficial to forming large-size members. With respect to this problem, the inventor prepares the whiskers into a porous whisker preform with uniform pores by a gel-casting process in the earlier stage, introduces a matrix into the preform, obviously improving the toughness of the densified composite, and making the densified composite to bear higher load, resist high temperature and have the characteristic of isotropy. Relevant studies include: Naiqi Chen et al. discloses the preparation of isotropic network-like silicon carbide whisker preforms using a gel-casting process. (Ceramics International, 2018, 44(1): 969-979). However, the preparation method has high requirements on equipment, needs a complex forming process and is difficult to prepare large-size and thick-wall parts.

The nanowire has good temperature resistance and high intrinsic mechanical property, and can be used as a reinforcement to ensure that the composite has more excellent comprehensive properties. In previous studies, researchers have attempted to incorporate nanowire reinforcement into ceramic materials to achieve toughening, often by mechanical mixing or in-situ synthesis. Under the mechanical mixing process, the nanowires are easy to form agglomeration to cause uneven stress distribution, and the mechanical property of the composite is deteriorated; adopting the in-situ synthesis, the uniformity of the nanowires is improved to a certain extent, but the volume fraction is generally low, the preparation process conditions are very harsh, and the difficulty of process control is very high. Therefore, there is a need to develop a novel process for preparing nanowire ceramic preforms, so that the prepared preforms are suitable for preparing parts with complex shapes, large sizes and thick walls, and the defects of continuous fiber preforms and whisker preforms are effectively overcome. The inventor has the following novel preparation process: the integration of nanowire preparation and preform molding is directly achieved through a process design, namely, the nanowire preform macroform with certain mechanical strength is obtained through in-situ forming. The nanowires in the preforms need to be capable of realizing mutual bridging to form a three-dimensional disordered network, so that the isotropy requirement of the composite is met; the preforms can achieve in-situ forming, does not need to be woven to form into the preforms as the continuous fibers, does not need to be cast or hot-pressed to form into the preforms as the whiskers, and avoids damaging the reinforcement of the preforms. However, at present, there is no report on the study of the ceramic nanowire preform as described above. Some other studies include: Yehong Cheng et al. discloses the adoption of a chemical vapor deposition (CVD) method to grow bamboo-shaped silicon carbide nanowires with the diameter of about 300 nm on the graphene aerogel so as to prepare the silicon carbide nanowire-graphene aerogel (Applied Surface Science, 2018, 448: 138-144); Lei Su et al. discloses the preparation of silicon carbide nanowire aerogel by pyrolyzing siloxane sol, wherein the diameter of the silicon carbide nanowire is 20-50 nm, and the length is tens to hundreds of μms. The silicon carbide nanowires have high curvature, and the aerogel overall presents good flexibility. (ACS Nano, 2018, 12(4): 138-144). Most of the researches are to grow the nanowires on the surface of the aerogel/foam material of other material systems for modification, or to prepare flexible aerogel materials of nanowires. The methods cannot obtain a pure ceramic nanowire preform macroform with certain structural strength. In addition, CN108467253A and CN108117403A disclose that a carbon foam matrix is first prepared as a template by pyrolyzing melamine foam at a higher temperature, such as 400° C. to 500° C., and then a SiC nanowire preform is obtained by using a normal pressure Chemical Vapor Deposition (CVD) method, so as to prepare a SiC ceramic matrix composite or alumina aerogel reinforced by the preform. The template used by the method needs to be pyrolyzed in advance to prepare the carbon foam matrix, wherein the required temperature is higher, the process is more complex, and the prepared SiC nanowire reinforced SiC ceramic matrix composite has a higher density, as recited in claim 2 of CN108117403A, and the density of the composite is 2.8-3.1 $g/cm^3$.

In conclusion, the ceramic nanowire preform is an excellent candidate for the ceramic matrix composite preform and is difficult to obtain by the existing preparation process. With respect to the requirements of use under medium-high temperature (1300-1400° C.) and ultrahigh temperature (2000° C.) environments, a process for the preparation of a nanowire preform of ceramic matrix composite with strong universality is urgently required to be developed.

SUMMARY

In view of this, the present invention provides a process for the preparation of a ceramic nanowire preform for a ceramic matrix composite, and in particular relates to a process for the preparation of a ceramic nanowire preform by combining a template technique and a preceramic polymer conversion technique.

The process of the present invention mainly comprises the steps of preparing a mixed batch of template-supported precursor, preparing a green of template-supported precursor, pyrolyzing the preceramic polymer precursor and removing the template. Prior to the preparation of the mixed batch of template-supported precursor, it is generally necessary to prepare a precursor solution, and optionally, to pretreat the template.

Moreover, the present invention provides an isotropic ceramic nanowire preform prepared by the above process.

Compared to the preform prepared by the process of the prior art, the ceramic nanowire preform obtained by the process of the present invention has the following advantageous effects:

(1) the ceramic nanowire preform prepared by the present process has certain mechanical strength, has the characristics of low density, high porosity, large specific surface area, good thermal stability, good chemical stability and the like, and has potential to be applied to ceramic matrix composites as an isotropic all-nano preform;

(2) the interior of the ceramic nanowire preform prepared by the present process is of an interconnected three-dimensional network structure, wherein the nanowire has pure components, controllable structure and uniform distribution, and the problems of agglomeration, uneven distribution, density gradient and the like do not exist. On the one hand, the uniformity of the intrinsic performance of the composite can be ensured, so that the performance is improved; on the other hand, when it is applied to a composite (for example, as a reinforcement of the composite), isotropy can be achieved, the excellent characteristics of the nanowire can be exerted to the maximum extent, and the performance of the composite can be fully improved;

(3) the present process combines a template method and a preceramic polymer conversion method, and is characterized in that: by controlling the process parameters such as precursor concentration, the ratio of precursor solution to the template, and the preparation pressure of the preform, the regulation and optimization of the structure, the size and the volume fraction of the nanowire in the ceramic nanowire preform can be achieved; and (4) the present process has the advantages of simple steps, short period and relatively low cost. On the basis of effectively ensuring the yield of the nanowire, the process also has good stability and repeatability, has potential to be developed into an engineering and industrial preparation technology of the ceramic nanowire preform, and lays a process foundation for mass production of the ceramic nanowire preform.

DETAILED DESCRIPTION

Definition

The term "precursor" as used herein is a form of existence before the target product is obtained, and is an organic polymer that can be converted to an inorganic body by pyrolysis at high temperatures.

The term "template" as used herein refers to a carrier that loads the precursor such that the precursor reacts and grows along its inner space to give a nanowire preform.

The term "nanowire" as used herein refers to a one-dimensional structure having a lateral dimension limited to about or even less than 100 nm (without limitation in the longitudinal direction), with a typical nanowire aspect ratio of above 1000. According to the compositions of the nanowires, they can be classified into various types including metal nanowires, semiconductor nanowires, insulator nanowires, molecular nanowires, and the like.

As used herein, the singular forms "a", "an" and "the" may be intended to include the plural forms as well, unless the context clearly indicates otherwise. Other than in the examples provided at the end of the detailed description, all numerical values of parameters (e.g., of quantities or conditions) in this specification, including the appended claims, are to be understood as being modified in all instances by the term "about" whether or not "about" actually appears before the numerical value.

The terms "comprises", "comprising", "including" and "having" are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising" is to be understood as a non-restrictive term used to describe and claim various embodiments set forth herein, in certain aspects, the term may alternatively be understood to instead be a more limiting and restrictive term, such as "consisting of" or "consisting essentially of".

Precursor

The precursor of the present invention is an organic polymer precursor, in particular a silicon-based ceramic polymer precursor or an ultrahigh temperature-based ceramic polymer precursor. The ultrahigh temperature-based ceramic polymer precursor includes boride, carbide, nitride and their composite. Preferably, the silicon-based ceramic polymer precursor can be selected from the group consisting of polycarbosilanes, polysilazanes, polysiloxanes, polysilanes and the combination thereof, and the ultrahigh temperature-based ceramic polymer precursor can be selected from the group consisting of polyzirconocarbanes, polyzirconoboranes, polytitanocarbosilane (PTCS), polyzirconocarbosilane (PZCS) and the combination thereof. More preferably, the precursor is selected from polycarbosilanes, polysilazanes or polyzirconoboranes.

Template

In the field of preparing nanomaterials by a template method, the templates used can be generally divided into soft templates and hard templates. The soft template is usually formed by aggregating surfactant molecules, and mainly comprises various ordered polymers formed by amphiphilic molecules, such as liquid crystals, vesicles, micelles, micro-emulsions, self-assembled membranes, self-organized structures of biomolecules and macromolecules and the like. The hard template is mainly a rigid template which is maintained through covalent bonds, such as polymers with different space structures, anodic aluminum oxide films, porous silicon, metal templates, natural high molecular materials, molecular sieves, colloidal crystals and the like. Compared with a soft template, the hard template has higher stability and good narrow-space confinement effect, and can strictly control the size and the shape of the nanomaterial.

As for the hard template, an anodized aluminum oxide template (AAO) or polycarbonate (PC) is most commonly used in the prior art. The process according to the present invention adopts the carbonaceous material as the template for preparing the nanowire preforms. Preferably, the carbonaceous template can comprise carbonaceous material in the form of powders, particles or chopped fibers. In a preferred embodiment, the carbonaceous template is selected from the group consisting of activated carbon powders, activated carbon particles, chopped carbon fibers and the combination thereof. Most preferably, the carbonaceous template is activated carbon powder. In the present invention, suitable carbonaceous templates have a size of at least about 150 meshes, preferably a size of at least about 200 meshes; alternatively, the carbonaceous templates have a size of from about 150 meshes to about 300 meshes, more preferably, from about 180 meshes to about 250 meshes, and most preferably, about 200 meshes. As known to those skilled in the art, the carbonaceous template used in the process of the present invention has the advantages of low cost, light weight, easy availability, easy removal, etc., compared to other templates in the prior art.

Nanowire Preform

The nanowire preform is obtained by further processing the precursor. Therefore, the material of the nanowire preform corresponds to that of the precursor. The nanowire preforms of the present invention can include a silicon-based ceramic nanowire preform (e.g., SiC, $Si_3N_4$), an ultrahigh temperature-based ceramic nanowire preform (e.g., $ZrB_2$, ZrC), and the like, classified according to the properties of the preforms. The nanowire preforms of the present invention can include carbides (e.g. SiC, ZrC), nitrides (e.g. $Si_3N_4$, BN) and borides (e.g. $ZrB_2$), classified according to the elements contained in the preforms. For the present invention, preferably, the nanowire preform is selected from the group consisting of a silicon carbide (SiC) nanowire preform, a silicon nitride ($Si_3N_4$) nanowire preform, a zirconium boride ($ZrB_2$) nanowire preform and the combination thereof; more preferably, the nanowire preform is selected from a silicon carbide (SiC) nanowire preform or a silicon nitride (Si$_3$N$_4$) nanowire preform.

The nanowire preforms according to the invention are isotropic, having a lower bulk density and a higher volume fraction. In the case of silicon carbide or silicon nitride nanowire preforms, the bulk density can reach about 0.05 g/cm$^3$ to about 0.3 g/cm$^3$, even about 0.07 g/cm$^3$ to about 0.2 g/cm$^3$, and the volume fraction can reach about 5% to about 27%, preferably about 10% to about 25%, and more preferably about 15% to about 22%.

Preparation Process

Preparation of Precursor Solution

The precursor and a solvent are mixed at a certain weight ratio, and the mixture is stirred at a certain rotating speed until the mixture is dissolved in the solvent, obtaining a precursor solution. The solvent can be any organic solvent capable of sufficiently dissolving the precursor. The organic solvent is preferably selected from the group consisting of toluene, xylene, cyclohexane, acetone and the combination thereof.

The amount of solvent in the precursor solution is preferably sufficient to dissolve the precursor, wherein the weight ratio of the precursor to the solvent is about 1:(0.1-20), preferably about 1:(0.5-15), more preferably about 1:(2-12), most preferably about 1:(4-10). The amount of solvent here cannot be too high or too low; if the amount of solvent is too low, the precursor cannot be completely dissolved; on the contrary, if the amount of the solvent is too high, the mixed batch prepared in the subsequent step cannot be in a pasty form, and thus a green cannot be prepared according to the process of the present invention.

The stirring can be performed by common means used in the art, such as mechanical stirring, magnetic stirring, etc., preferably magnetic stirring, e.g. a continuous stirring at a rotating speed of about 200 rpm for about 15 min to about 1 h, preferably a continuous stirring for about 30 min.

After the precursor solution is sufficiently stirred, a certain amount of catalyst is added thereto, followed by further stirring until the catalyst is uniformly distributed in the precursor solution. The mode and time of stirring are similar to those in the previous paragraph, as long as the catalyst is uniformly distributed in the precursor solution. The catalysts described herein are used for growing nanowires in subsequent steps.

The catalyst can be added in an amount of from about 1 wt % to about 15 wt %, preferably from about 2 wt % to about 10 wt %, more preferably from about 3 wt % to about 6 wt %, and most preferably about 5 wt %, based on the weight of the precursor solution. The amount of catalyst here cannot be too high or too low; if the amount of catalyst is too low, the yield of the finally obtained nanowires is too low; if the amount of catalyst is too high, cross-linking and agglomeration between crystals can occur during subsequent precursor pyrolysis, resulting in the formation of nanoparticles and even microparticles, making it difficult to obtain the nanowires with excellent properties. The catalyst is an organic transition metal compound with aromaticity, preferably phenylacetic acid transition metal salt or cyclopentadienyl transition metal compound, and more preferably, ferric phenylacetate, ferrocene or nickelocene.

Optionally Pretreatment of Template

Optionally, the template is pretreated prior to mixing the precursor solution with the template. The purpose of the pretreatment is to remove impurities that may be present in the template. The removal of impurities can be performed by soaking in an organic solvent and/or water for a certain period of time. The organic solvent is preferably acetone. For example, the template can be soaked in acetone for about 0.5 days to about 3 days, preferably about 24 h to about 48 h, and then soaked in distilled water at a temperature of about 60° C. to about 95° C., preferably about 70° C. to about 90° C. for about 15 min to about 2 h, preferably about 30 min to about 1 h.

Subsequently, the soaked template is dried. Specifically, the template can be dried in a vacuum oven at a temperature of about 50° C. to about 130° C., preferably about 60° C. to about 100° C., for about 6 h to about 48 h, and preferably about 12 h to about 24 h.

Preparation of Mixed Batch of Template-Supported Precursor

The template, optionally with the impurities removed, and the prepared precursor solution are mixed at a certain ratio to prepare a mixed batch of template-supported precursor. Herein, the present invention adopts carbonaceous material as a template, the weight ratio of which to the precursor solution is about (0.8-10):1, preferably about (1-5):1. The weight ratio of the template to the precursor solution of the present invention enables the resulting mixed batch to be in a pasty form, thereby eliminating the need for further removal of solvent from the mixed batch prior to preparation of the green. The amount of the carbonaceous template cannot be too high or too low; if the amount of the template is too low, a green with a certain structural morphology is difficult to obtain in the subsequent pressing process; and if the amount of the template is too high, the nanowires cannot be interwoven in a three-dimensional space to form a nanowire preform macroform.

The mixed batch is then stirred for a period of time until it is homogeneous. The stirring can adopt a common stirring mode, including mechanical stirring, magnetic stirring and the like. For example, the mixed batch can be poured into a beaker and continuously stirred with mechanical stirring at a speed of about 200 rpm for about 5 min to about 30 min, preferably about 8 min to about 20 min, and more preferably about 10 min.

Preparation of Green of Template-Supported Precursor

In order to achieve the regulation and optimization of properties such as structure, size, volume fraction and the like of the nanowire in the ceramic nanowire preform, a green with a certain structural morphology and compactness can be prepared before the nanowire grows.

The process according to the present invention can obtain a pasty form by suitably controlling the ratio of template to precursor solution, thereby eliminating the step of further removing the solvent from the precursor solution.

The green according to the present invention is preferably obtained by press molding. Specifically, the prepared mixed batch is placed in a mold and the mixed batch is pressed using a tablet press under a pressure, preferably from about 1 MPa to about 10 MPa. Then, the press-molded green is unloaded from the mold.

Pyrolysis of Polymer Precursor

The methods for in situ nanowire growth can generally be divided into two categories, namely the catalyst-containing method and the catalyst-free method. The currently reported catalyst-free growth methods are mainly gas phase methods, including Chemical Vapor Infiltration (CVI) and Chemical Vapor Deposition (CVD), and for example, CN108467253A and CN108117403A all use a catalyst-free method, and use a Chemical Vapor Deposition (CVD) method to prepare nanowire preforms.

In contrast, the process of the present invention employs a catalyst-containing process. The uniform growth of the nanowire can be achieved through the uniform distribution of the catalyst in the precursor solution. Compared with the catalyst-free method, the catalyst-containing method enables the finally obtained nanowire preform to have smaller diameter, larger length-diameter ratio, fewer defects and smoother surface.

Specifically, the green obtained by pressing is placed into a furnace for nanowire growth. Typically, the furnace can be a vacuum tube furnace. In the growth process, parameters such as vacuum degree, heating rate, pyrolysis temperature, maintaining time of the pyrolysis temperature and the like in the furnace are controlled. Generally, the vacuum degree in the furnace can be controlled to be about 0.08 MPa to about 0.1 MPa, preferably about 0.09 MPa; the heating rate ranges from about 2° C./min to about 15° C./min, preferably from about 3° C./min to about 10° C./min; the pyrolysis temperature ranges from about 1100° C. to about 1600° C., preferably from about 1200° C. to about 1500° C., wherein the pyrolysis temperature is maintained for about 0.5 h to about 5 h, preferably about 1 h to about 3 h. While the nanowire grows, the solvent remained in the green is evaporated and removed due to the high temperature in the furnace.

Subsequently, the temperature of the furnace is descended at a certain rate to an intermediate temperature of about 500° C. to about 700° C., preferably about 600° C., and then the template-containing nanowire preform in the furnace is continuously cooled freely with the furnace to room temperature. Afterwards, the template-containing nanowire preform is taken out. Similar to the heating rate, the descending rate can range from about 2° C./min to about 15° C./min, preferably from about 3° C./min to about 10° C./min.

During nanowire growth, it is often necessary to introduce a protective atmosphere into the furnace. Typically, the protective atmosphere can be nitrogen or an inert gas such as argon.

Removal of Template

The methods of template removal often vary according to the specific templates. Typical methods for template removal include oxidation, dissolution by strong acid or strong base, dissolution by organic solvent, and the like.

For the oxidation method, it is generally carried out by heating at a relatively high temperature in an oxygen-containing atmosphere. In the dissolution by strong acid or strong base method, the template can be dissolved with a strong acid such as nitric acid or hydrochloric acid, or a strong base such as sodium hydroxide or potassium hydroxide. For the dissolution by organic solvent method, the template can be dissolved using an organic solvent such as dichloromethane.

Since the process of the present invention employs carbonaceous material as a template, it is preferred to remove the carbonaceous template by oxidation. Specifically, the nanowire preform containing the template is placed in a furnace, such as a tube furnace, and heated in an air atmosphere to the temperature of about 500° C. to about 700° C., preferably about 600° C. at a certain heating rate, and is maintained at this temperature for a period of time to remove the carbonaceous template, wherein the heating rate ranges from about 2° C./min to about 15° C., preferably from about 3° C./min to about 10° C./min, and the maintaining time ranges from about 3 h to about 10 h, preferably about 4 h to about 7 h. Thereby the nanowire preform prepared by the process of the present invention can be obtained.

In the following Embodiment [1], the present invention relates to a process for the preparation of an isotropic ceramic nanowire preform, which comprises the steps of:

Step 1, pretreatment of activated carbon: an activated carbon powder is adopted as a template. The activated carbon powder is soaked in acetone for about 24 h to about 48 h, and soaked in distilled water of the temperature of about 70° C. to about 90° C. for about 30 min to about 1 h to remove impurities in the activated carbon powder. Then, the activated carbon powder is placed in a vacuum oven for drying at the temperature of about 60° C. to about 100° C. for about 12 h to about 24 h;

Step 2, preparation of precursor solution: an organic polymer precursor (such as polycarbosilanes, polysilazanes, polyzirconocarbanes and polyzirconoboranes, etc.) of a silicon-based ceramic or ultrahigh temperature system precursor and xylene/cyclohexane are mixed at a weight ratio of about 1:(0.5-10) to prepare a precursor solution, which is continuously stirred for about 30 min at a rotating speed of about 200 rpm using magnetic stirring. About 5 wt % of catalyst (selected from the group consisting of ferrocene, ferric phenylacetate, nickelocene, etc.) is mixed into the precursor solution, and the magnetic stirring is further conducted for about 30 min at a rotating speed of about 200 r/min;

Step 3, preparation of a mixed batch of an active carbon supported precursor: a certain amount of the activated carbon powder subjected to impurity removal is mixed with the precursor solution obtained in Step 2 to prepare a mixed batch of an active carbon supported precursor, wherein the weight ratio of the activated carbon powder to the precursor solution is about (1-5):1. The mixed batch is poured into a beaker, and mechanical stirring is continuously conducted for about 10 min at a rotating speed of about 200 rpm;

Step 4, preparation of a green of an active carbon supported precursor: in order to enable the prepared nanowire preform to have a certain structural morphology, the stirred mixed batch is placed into a mold, and is pressed into a green in a tablet press at a pressure of about 1 MPa to about 10 MPa. The press-molded green is unloaded from the mold;

Step 5, pyrolysis of a polymer precursor: the pressed green of active carbon supported precursor is placed into a vacuum tube furnace for pyrolysis and growth of nanowire, wherein the vacuum degree in the furnace is about 0.09 MPa, the heating rate in the pyrolysis process is about 3° C./min to about 10° C./min, the pyrolysis temperature is about 1200° C. to about 1500° C., and the maintaining time of this pyrolysis temperature is about 1 h to about 3 h. Then it is cooled to about 600° C. at a rate of about 3° C./min to about 10° C./min, and further cooled along with the furnace. Argon is required to be introduced as a protective atmosphere for the preparation of the silicon carbide nanowire preform, and nitrogen is required to be introduced as a protective atmosphere for the preparation of the silicon nitride nanowire preform;

Step 6, removal of the activated carbon: the ceramic nanowire preform containing the activated carbon obtained in Step 5 is placed into a tube furnace to conduct oxidation in an air atmosphere to remove the activated carbon, wherein the oxidation temperature is about 600° C., and the heating rate ranges from about 3° C./min to about 10° C./min. Then, it is cooled along with the furnace after maintaining the oxidation temperature for about 4 h to about 7 h. Thus, a ceramic nanowire preform is obtained.

The process for the preparation of an isotropic ceramic nanowire preform according to Embodiment [1], wherein the activated carbon powder in Step 1 is a powdered activated carbon having a size of at least about 200 meshes.

The process for the preparation of an isotropic ceramic nanowire preform according to Embodiment [1], wherein the precursor in Step 2 comprises one or more silicon-based or ultrahigh temperature-based precursor solutions of polycarbosilanes, polysilazanes, polyzirconocarbanes and polyzirconoboranes, etc. The dilution ratio of the polymer precursor to the xylene/cyclohexane is about 1:(0.5-10) by weight.

The process for the preparation of an isotropic ceramic nanowire preform according to Embodiment [1], wherein the weight ratio of the activated carbon powder to the precursor solution in Step 3 is about (1-10):1.

The process for the preparation of an isotropic ceramic nanowire preform according to Embodiment [1], wherein the mixed batch is pressed into a green in a tablet press at a pressure of about 1 to 10 MPa.

The process for the preparation of an isotropic ceramic nanowire preform according to Embodiment [1], wherein the pyrolysis temperature of the polymer precursor in Step 5 ranges from 1200° C. to 1500° C., and the maintaining time of this pyrolysis temperature ranges from about 1 h to about 3 h.

The process for the preparation of an isotropic ceramic nanowire preform according to Embodiment [1], wherein the removal condition of the activated carbon in Step 6 includes an oxidation temperature of about 600° C., which is maintained for about 4-7 h.

EXAMPLES

Materials and Apparatuses for Measurements

The experiment data as related in the Examples were all obtained using the following materials, apparatuses and methods.
1) Activated Carbon: powder, 200 meshes, purchased from Yuhe Environment-Friendly Material Factory in Ludian Town of Dengfeng City;
2) Acetone: AR level;
3) Polycarbosilanes, Polysilazanes, and Polyzirconoboranes: purchased from Institute of Chemistry Chinese Academy of Sciences;
4) Catalysts of Ferrocene and Nickelocene: purchased from Tianjin Kemiou Chemical Reagent Co.;
5) Tube Furnace: available as GSL-1700X from Hefei Kejing Materials Technology Co., Ltd;
6) Tablet Press: purchased as HY-12 from Tianjin Tianguang Optical Instruments Co., Ltd;
7) The bulk density and volume fraction were obtained using a mercury intrusion method by an AutoPore IV 9500 Mercury Porosimeter, wherein the bulk density meant the mass of a material per unit volume (including the solid material and its open pores and closed pores) in its natural state, and was measured under the mercury filling pressure of 0.50 psia; volume fraction=100%−pore volume fraction/porosity;
8) Scanning Electron Microscope (SEM): S-4700;
X-ray Diffractometer (XRD): AXS D8;
Transmission Electron Microscope (TEM): FEI Talos F200X.

Example 1

Step 1, pretreatment of activated carbon: an activated carbon powder was adopted as a template. The activated carbon powder was soaked in acetone for 24 h, and soaked in distilled water of the temperature of 90° C. for 30 min to remove impurities in the activated carbon powder. Then, the activated carbon powder was placed in a vacuum oven for drying at the temperature of 100° C. for 12 h;

Step 2, preparation of precursor solution: a precursor of polycarbosilane and xylene were mixed at a weight ratio of 1:5 to prepare a precursor solution, which was continuously stirred for 30 min at a rotating speed of 200 rpm using magnetic stirring. Then, 5 wt % of catalyst of nickelocene was mixed into the precursor solution, and the magnetic stirring was further conducted for 30 min at a rotating speed of 200 r/min;

Step 3, preparation of a mixed batch of an active carbon supported precursor: a certain amount of the activated carbon powder subjected to impurity removal was mixed with the precursor solution obtained in Step 2 to prepare a mixed batch of an active carbon supported precursor, wherein the weight ratio of the activated carbon powder to the precursor solution was 3:1. The mixed batch was poured into a beaker, and mechanical stirring was continuously conducted for 10 min at a rotating speed of 200 rpm;

Step 4, preparation of a green of an active carbon supported precursor: in order to enable the prepared nanowire preform to have a certain structural morphology, the stirred mixed batch was placed into a mold, and was pressed into a green in a tablet press at a pressure of 2 MPa. The press-molded green was unloaded from the mold;

Step 5, pyrolysis of a polymer precursor: the pressed green of active carbon supported precursor was placed into a tube furnace for pyrolysis and growth of nanowire, wherein argon was introduced as a protective atmosphere, the vacuum degree in the furnace was 0.09 MPa, the heating rate in the pyrolysis process was 3° C./min, and the pyrolysis temperature was 1500° C., which was maintained for 3 h. Then it was cooled to 600° C. at a rate of 5° C./min, and further cooled along with the furnace;

Step 6, removal of the activated carbon: the silicon carbide nanowire preform containing the activated carbon obtained in Step 5 was placed into a tube furnace to conduct oxidation in an air atmosphere to remove the activated carbon, wherein the oxidation temperature was 600° C., and the heating rate was 5° C./min. Then, it was cooled along with the furnace after maintaining the oxidation temperature for 7 h. Thus, a silicon carbide nanowire preform was obtained.

Figure 1:
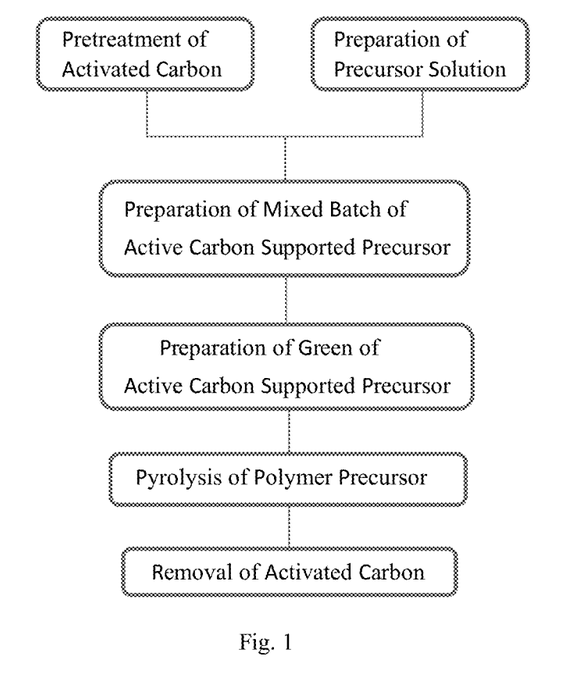
FIG. 1 is one embodiment of a flow diagram of the process of the present invention.
Figure 2:
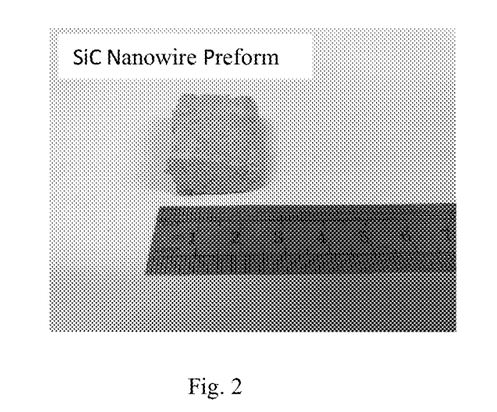
FIG. 2 is a macroscopic photograph of the silicon carbide nanowire preform according to Example 1 of the present Description.
Figure 3:
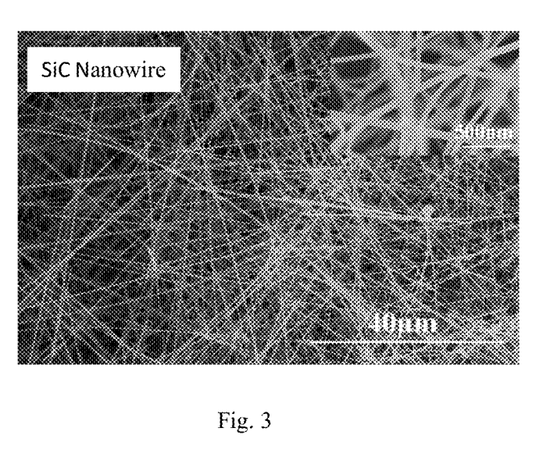
FIG. 3 is a Scanning Electron Microscope (SEM) photograph of a silicon carbide nanowire preform according to Example 1 of the present Description; it can be seen that the silicon carbide nanowire preform prepared by the process of the present invention is isotropic and has a diameter of about 100 nm.
Figure 4:
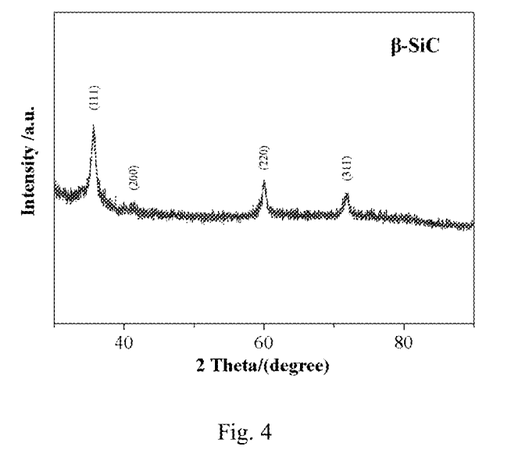
FIG. 4 is an X-ray diffraction (XRD) pattern of a silicon carbide nanowire preform according to Example 1 of the present Description; it can be seen that the single crystal structure with the crystal form of beta-SiC is prepared by the process of the present invention and has better mechanical property than that of the polycrystalline structures as known by those skilled in the art.
Figure 5:
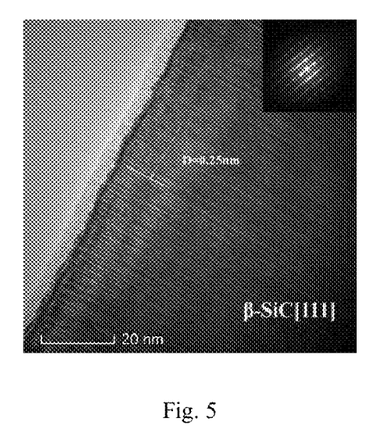
FIG. 5 is a Transmission Electron Microscope (TEM) photograph of a silicon carbide nanowire preform according to Example 1 of the present Description; the crystal face distance D can further prove that the single crystal structure with the crystal form of beta-SiC is prepared by the process of the present invention, and the prepared silicon carbide nanowire preform has the advantages of smooth surface, less defects, large length-diameter ratio and small diameter.

The nanowire in the silicon carbide nanowire preform prepared by Example 1 has a bulk density of 0.107 g/cm$^3$, a volume fraction of 18%, a diameter of about 100 nm, and a crystal form of beta-SiC which is in the form of single crystal.

Example 2

Step 1, pretreatment of activated carbon: an activated carbon powder was adopted as a template. The activated carbon powder was soaked in acetone for 24 h, and soaked in distilled water of the temperature of 90° C. for 30 min to remove impurities in the activated carbon powder. Then, the activated carbon powder was placed in a vacuum oven for drying at the temperature of 100° C. for 12 h;

Step 2, preparation of precursor solution: a precursor of polysilazane and cyclohexane were mixed at a weight ratio of 1:5 to prepare a precursor solution, which was continuously stirred for 30 min at a rotating speed of 200 rpm using magnetic stirring. Then, 5 wt % of catalyst of ferrocene was mixed into the precursor solution, and the magnetic stirring was further conducted for 30 min at a rotating speed of 200 r/min;

Step 3, preparation of a mixed batch of an active carbon supported precursor: a certain amount of the activated carbon powder subjected to impurity removal was mixed with the precursor solution obtained in Step 2 to prepare a mixed batch of an active carbon supported precursor, wherein the weight ratio of the activated carbon powder to the precursor solution was 3:1. The mixed batch was poured into a beaker, and mechanical stirring was continuously conducted for 10 min at a rotating speed of 200 rpm;

Step 4, preparation of a green of an active carbon supported precursor: in order to enable the prepared nanowire preform to have a certain structural morphology, the stirred mixed batch was placed into a mold, and was pressed into a green in a tablet press at a pressure of 5 MPa. The press-molded green was unloaded from the mold;

Step 5, pyrolysis of a polymer precursor: the pressed green of active carbon supported precursor was placed into a tube furnace for pyrolysis and growth of nanowire, wherein nitrogen was introduced as protective atmosphere, the vacuum degree in the furnace was 0.09 MPa, the heating rate in the pyrolysis process was 3° C./min, and the pyrolysis temperature was 1500° C., which was maintained for 3 h. Then it was cooled to 600° C. at a rate of 5° C./min, and further cooled along with the furnace;

Step 6, removal of the activated carbon: the silicon nitride nanowire preform containing the activated carbon obtained in Step 5 was placed into a tube furnace to conduct oxidation in an air atmosphere to remove the activated carbon, wherein the oxidation temperature was 600° C., and the heating rate was 5° C./min. Then, it was cooled along with the furnace after maintaining the oxidation temperature for 7 h. Thus, a silicon nitride nanowire preform was obtained.

Figure 6:
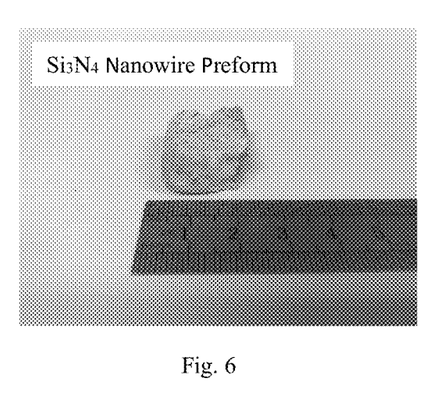
FIG. 6 is a macroscopic photograph of the silicon nitride nanowire preform according to Example 2 of the present invention.
Figure 7:
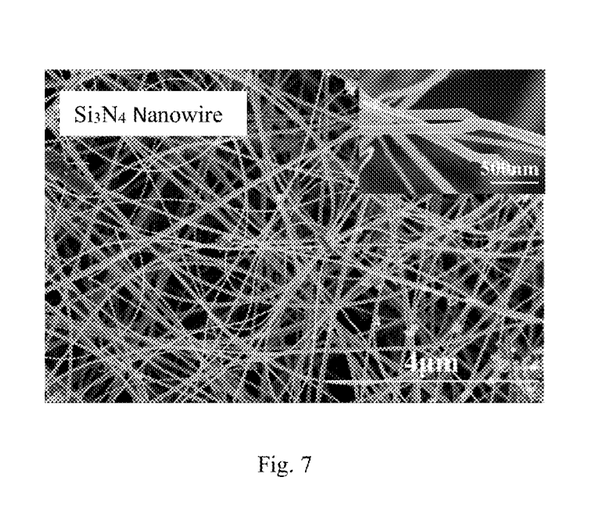
FIG. 7 is a Scanning Electron Microscope (SEM) photograph of a silicon nitride nanowire preform according to Example 2 of the present Description; it can be seen that the silicon nitride nanowire preform prepared by the process of the present invention is isotropic and has a diameter of about 100 nm.
Figure 8:
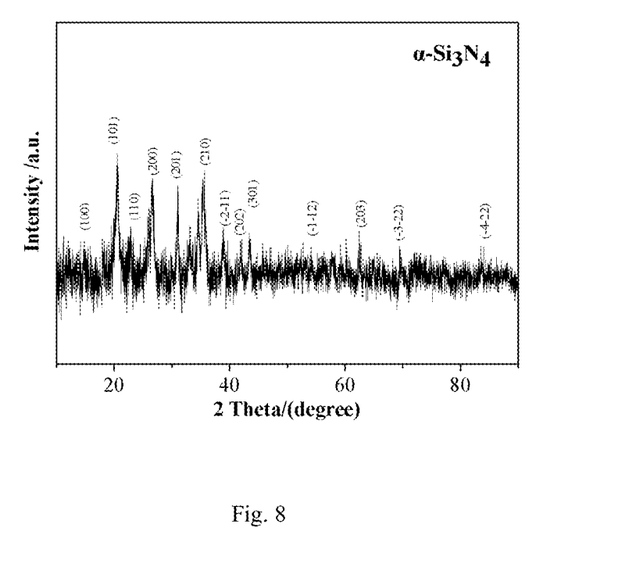
FIG. 8 is an X-ray diffraction (XRD) pattern of a silicon nitride nanowire preform according to Example 2 of the present Description; it can be seen that the single crystal structure with the crystal form of alpha-$Si_3N_4$ is prepared by the process of the present invention and has better mechanical property than that of the polycrystalline structures as known by those skilled in the art.
Figure 9:
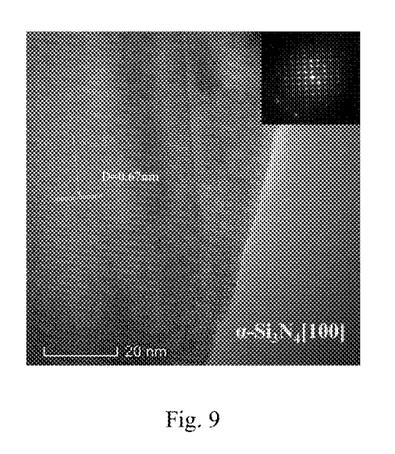
FIG. 9 is a Transmission Electron Microscope (TEM) photograph of a silicon nitride nanowire preform according to Example 2 of the present Description; the crystal plane distance D can further prove that the single crystal structure with the crystal form of alpha-$Si_3N_4$ is prepared by the process of the present invention, and the prepared silicon nitride nanowire preform has smooth surface, less defects, large length-diameter ratio and small diameter.

The nanowire in the silicon nitride nanowire preform prepared by Example 2 has a bulk density of 0.073 g/cm$^3$, a volume fraction of 18%, a diameter of about 100 nm, and a crystal form of alpha-$Si_3N_4$ which is in the form of single crystal.

Example 3

Step 1, pretreatment of activated carbon: an activated carbon powder was adopted as a template. The activated carbon powder was soaked in acetone for 24 h, and soaked in distilled water of the temperature of 70° C. for 1 h to remove impurities in the activated carbon powder. Then, the activated carbon powder was placed in a vacuum oven for drying at the temperature of 100° C. for 24 h;

Step 2, preparation of precursor solution: a precursor of polycarbosilane and cyclohexane were mixed at a weight ratio of 1:10 to prepare a precursor solution, which was continuously stirred for 30 min at a rotating speed of 200 rpm using magnetic stirring. Then, 5 wt % of catalyst of ferrocene was mixed into the precursor solution, and the magnetic stirring was further conducted for 30 min at a rotating speed of 200 r/min;

Step 3, preparation of a mixed batch of an active carbon supported precursor: a certain amount of the activated carbon powder subjected to impurity removal was mixed with the precursor solution obtained in Step 2 to prepare a mixed batch of an active carbon supported precursor, wherein the weight ratio of the activated carbon powder to the precursor solution was 2:1. The mixed batch was poured into a beaker, and mechanical stirring was continuously conducted for 10 min at a rotating speed of 200 rpm;

Step 4, preparation of a green of an active carbon supported precursor: in order to enable the prepared nanowire preform to have a certain structural morphology, the stirred mixed batch was placed into a mold, and was pressed into a green in a tablet press at a pressure of 3 MPa. The press-molded green was unloaded from the mold;

Step 5, pyrolysis of a polymer precursor: the pressed green of active carbon supported precursor was placed into a tube furnace for pyrolysis and growth of nanowire, wherein argon was introduced as protective atmosphere, the vacuum degree in the furnace was 0.09 MPa, the heating rate in the pyrolysis process was 3° C./min, and the pyrolysis temperature was 1300° C., which was maintained for 2 h. Then it was cooled to 600° C. at a rate of 5° C./min, and further cooled along with the furnace;

Step 6, removal of the activated carbon: the silicon carbide nanowire preform containing the activated carbon obtained in Step 5 was placed into a tube furnace to conduct oxidation in an air atmosphere to remove the activated carbon, wherein the oxidation temperature was 600° C., and the heating rate was 5° C./min. Then, it was cooled along with the furnace after maintaining the oxidation temperature for 7 h. Thus, a silicon carbide nanowire preform was obtained.

The nanowire in the silicon carbide nanowire preform prepared by Example 3 has a bulk density of 0.185 g/cm$^3$, a volume fraction of 20%, a diameter of about 100 nm, and a crystal form of beta-SiC which is in the form of single crystal.

Example 4

Step 1, pretreatment of activated carbon: an activated carbon powder was adopted as a template. The activated carbon powder was soaked in acetone for 24 h, and soaked in distilled water of the temperature of 90° C. for 30 min to remove impurities in the activated carbon powder. Then, the activated carbon powder was placed in a vacuum oven for drying at the temperature of 100° C. for 12 h;

Step 2, preparation of precursor solution: a precursor of polyzirconoborane and cyclohexane were mixed at a weight ratio of 1:6 to prepare a precursor solution, which was continuously stirred for 30 min at a rotating speed of 200 rpm using magnetic stirring. Then, 5 wt % of catalyst of ferrocene was mixed into the precursor solution, and the magnetic stirring was further conducted for 30 min at a rotating speed of 200 r/min;

Step 3, preparation of a mixed batch of an active carbon supported precursor: a certain amount of the activated carbon powder subjected to impurity removal was mixed with the precursor solution obtained in Step 2 to prepare a mixed batch of an active carbon supported precursor, wherein the weight ratio of the activated carbon powder to the precursor solution was 1:1. The mixed batch was poured into a beaker, and mechanical stirring was continuously conducted for 10 min at a rotating speed of 200 rpm;

Step 4, preparation of a green of an active carbon supported precursor: in order to enable the prepared nanowire preform to have a certain structural morphology, the stirred mixed batch was placed into a mold, and was pressed into a green in a tablet press at a pressure of 5 MPa. The press-molded green was unloaded from the mold;

Step 5, pyrolysis of a polymer precursor: the pressed green of active carbon supported precursor was placed into a tube furnace for pyrolysis and growth of nanowire, wherein argon was introduced as protective atmosphere, the vacuum degree in the furnace was 0.09 MPa, the heating rate in the pyrolysis process was 3° C./min, and the pyrolysis temperature was 1500° C., which was maintained for 3 h. Then it was cooled to 600° C. at a rate of 5° C./min, and further cooled along with the furnace;

Step 6, removal of the activated carbon: the zirconium boride nanowire preform containing the activated carbon obtained in Step 5 was placed into a tube furnace to conduct oxidation in an air atmosphere to remove the activated carbon, wherein the oxidation temperature was 600° C., and the heating rate was 5° C./min. Then, it was cooled along with the furnace after maintaining the oxidation temperature for 7 h. Thus, a zirconium boride nanowire preform was obtained.

From the above experimental data, it can be seen that the nanowire preform prepared by the process of the present invention, which combines the template technique and the preceramic polymer conversion technique and is an in-situ synthesis technique per se, has a lower bulk density and a higher volume fraction as shown by the above Examples. In other words, a lightweight ceramic nanowire preform can be obtained using the process of the present invention, and comparing with the volume fraction of 5% or less in the prior art, the nanowire preform prepared by the process of the present invention can obtain significantly increased volume fraction values. In addition, the nanowire preforms of the present invention have uniform diameters, all of which are about 100 nm, and are in the form of single crystals, which have better mechanical properties than that of the polycrystalline form as known by those skilled in the art.

It is obvious that the above Examples are only some of the embodiments of the present invention. Based on these embodiments of the present invention, other embodiments obtained by those skilled in the art without creative efforts and without departing from the process provided by the present invention also belong to the protection scope of the present invention.

What is claimed is:

1. A process for the preparation of a ceramic nanowire preform, comprising the following steps in sequence:
    Step a), mixing an organic polymer precursor with a solvent to obtain a precursor solution; then adding a catalyst, and uniformly distributing the catalyst in the precursor solution;
    Step b), adding a carbonaceous template into the precursor solution containing a catalyst obtained in Step a) to prepare a mixed batch of carbonaceous template-supported precursor in a pasty form;
    Step c), molding the mixed batch obtained in Step b) to obtain a green;
    Step d), pyrolyzing the green from Step c) to grow nanowire to obtain a nanowire preform containing the carbonaceous template; and
    Step e), removing the carbonaceous template.

2. The process according to claim 1, wherein in Step a), the organic polymer precursor is mixed with the solvent in a weight ratio of about 1:(0.1-20).

3. The process according to claim 1, wherein in Step a), the catalyst is added in an amount of about 1% to about 15%, based on the weight of the precursor solution.

4. The process according to claim 1 wherein in Step b), the weight ratio of the carbonaceous template to the precursor solution is about (0.8-10):1.

5. The process according to claim 1, wherein in Step e), removing the carbonaceous template is performed by oxidation under an oxygen-containing atmosphere.

6. The process according to claim 1, wherein there is no intermediate step between Step b) and Step c).

7. The process according to claim 1, which further comprises Step a') of pretreatment of the carbonaceous template prior to Step a), wherein possible impurities are removed by soaking the carbonaceous template in an organic solvent and/or water, followed by drying the soaked carbonaceous template.

8. The process according to claim 1, wherein the organic polymer precursor is selected from a silicon-based ceramic polymer precursor or an ultrahigh temperature-based ceramic polymer precursor.

9. The process according to claim 8, wherein the silicon-based ceramic polymer precursor is selected from the group consisting of polycarbosilanes, polysilazanes and the combination thereof, and the ultrahigh temperature-based ceramic polymer precursor is selected from the group consisting of polyzirconocarbanes, polyzirconoboranes and the combination thereof.

10. The process according to claim 8, wherein the organic polymer precursor is selected from polycarbosilanes, polysilazanes or polyzirconoboranes.

11. The process according to claim 1, wherein the carbonaceous template comprises a carbonaceous material in the form of powders, particles, or chopped fibers.

12. The process according to claim 1, wherein the catalyst comprises an organic transition metal compound with aromaticity selected from phenylacetic acid transition metal salts or cyclopentadienyl transition metal compounds.

13. The process according to claim 1, wherein the green from Step c) is made in a tablet press at a pressure of about 1 MPa to about 10 MPa.

14. The process according to claim 1, wherein in Step d), the furnace temperature is raised at a rate of about 2° C./min to about 15° C./min, to a pyrolysis temperature of about 1100° C. to about 1600° C., and the pyrolysis temperature is maintained for about 0.5 h to about 5 h.

15. The process according to claim 14, wherein in Step d), after the pyrolysis, the furnace temperature is descended at a rate of about 2° C./min to about 15° C./min, to an intermediate temperature of about 500° C. to about 700° C., and then the nanowire preform containing the carbonaceous template in the furnace is freely cooled along with the furnace.

16. The process according to claim 1, wherein in Step d), before the nanowire growth, a protective atmosphere is introduced into the furnace, said protective atmosphere being selected from nitrogen or an inert gas.

17. The process according to claim 1, wherein in Step e), removing the carbonaceous template is performed by oxidation in an air atmosphere at a temperature of about 500° C. to about 700° C.

18. The ceramic nanowire preform prepared by the process of claim 1, wherein the ceramic nanowire preform is isotropic.

19. The ceramic nanowire preform according to claim 18, which is a nanowire preform selected from the group consisting of a silicon carbide nanowire preform, a silicon nitride nanowire preform, a boron nitride nanowire preform, a zirconium boride nanowire preform, a zirconium carbide nanowire preform and a combination thereof.

20. The ceramic nanowire preform according to claim 18, which is a silicon carbide nanowire preform or silicon nitride nanowire preform and has a bulk density of from about 0.05 g/cm$^3$ to about 0.3 g/cm$^3$ and a volume fraction of from about 5% to about 27%.

21. The process according to claim 1, wherein the ceramic nanowire preform is isotropic.

22. The process according to claim 1, wherein the ceramic nanowire preform is selected from the group consisting of a silicon carbide nanowire preform, a silicon nitride nanowire preform, a boron nitride nanowire preform, a zirconium boride nanowire preform, a zirconium carbide nanowire preform, and a combination thereof.

23. The process according to claim 1, wherein the ceramic nanowire preform is a silicon carbide nanowire preform or a silicon nitride nanowire preform and has a bulk density of from about 0.05 g/cm$^3$ to about 0.3 g/cm$^3$ and a volume fraction of from about 5% to about 27%.

24. The process according to claim 11, wherein the carbonaceous material is selected from the group consisting of activated carbon powders, activated carbon particles, and chopped carbon fibers.

25. The process according to claim 12, wherein the organic transition metal compound with aromaticity is ferric phenylacetate, ferrocene, or nickelocene.

26. The process according to claim 1, wherein the catalyst comprises an organic transition metal compound with aromaticity is a phenylacetic acid transition metal salt.

27. The process according to claim 1, wherein the catalyst comprises ferric phenylacetate or nickelocene.

* * * * *